United States Patent
Lawson

(10) Patent No.: US 10,556,971 B2
(45) Date of Patent: Feb. 11, 2020

(54) PROCESS FOR DRYING POLYMERS

(71) Applicant: ExxonMobil Chemical Patents Inc., Baytown, TX (US)

(72) Inventor: Kevin W. Lawson, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 65 days.

(21) Appl. No.: 15/727,925

(22) Filed: Oct. 9, 2017

(65) Prior Publication Data

US 2018/0127519 A1   May 10, 2018

Related U.S. Application Data

(60) Provisional application No. 62/419,598, filed on Nov. 9, 2016.

(51) Int. Cl.
| | |
|---|---|
| *C08F 6/00* | (2006.01) |
| *C08F 6/12* | (2006.01) |
| *B01D 1/00* | (2006.01) |

(52) U.S. Cl.
CPC .............. *C08F 6/12* (2013.01); *B01D 1/0047* (2013.01); *B01D 1/0082* (2013.01)

(58) Field of Classification Search
CPC ...... B01D 1/00; B01D 1/0082; B01D 1/0047; C08F 6/12; C08F 6/10
See application file for complete search history.

(56) References Cited

U.S. PATENT DOCUMENTS

| | | | | |
|---|---|---|---|---|
| 3,285,899 A | * | 11/1966 | Houser | B01J 8/005 528/501 |
| 3,326,858 A | * | 6/1967 | Rapean | C08G 2/28 528/501 |
| 3,365,808 A | * | 1/1968 | James, Jr. | C08F 6/008 34/349 |
| 3,428,619 A | * | 2/1969 | Christensen | B01J 19/1837 528/501 |
| 3,631,605 A | * | 1/1972 | Wylie | B29B 13/06 34/349 |
| 4,126,743 A | * | 11/1978 | Shiomura | C08F 6/24 528/503 |
| 8,367,782 B2 | * | 2/2013 | Marissal | B01J 19/2415 526/61 |
| 8,597,582 B2 | * | 12/2013 | Hottovy | B01J 8/005 422/138 |
| 2008/0127507 A1 | | 6/2008 | Bindelle et al. | |

FOREIGN PATENT DOCUMENTS

| | | | |
|---|---|---|---|
| EP | 1914247 A | 4/2008 | |
| EP | 1914247 A1 * | 4/2008 | .............. B01J 4/001 |
| EP | 2110173 A | 10/2009 | |
| GB | 2157701 A * | 10/1985 | ................ C08F 6/24 |

* cited by examiner

*Primary Examiner* — Rip A Lee
(74) *Attorney, Agent, or Firm* — Kevin M. Faulkner

(57) ABSTRACT

A method for controlling the temperature of the inner surface of a transfer line dryer, and thus controlling the temperature of a polymer product flowing through the transfer line dryer, is explained. Also provided is a transfer line dryer apparatus that is useful for implementing the disclosed method.

13 Claims, 5 Drawing Sheets

PROCESS FOR DRYING POLYMERS

CROSS-REFERENCE TO RELATED APPLICATION

This application claims priority to and the benefit of U.S. Provisional Application 62/419,598, filed Nov. 9, 2016, which is incorporated herein by reference.

FIELD

This invention relates to processes for controlling the temperature within a transfer line dryer used in a process for removing diluents from a polymer product and to an apparatus for performing that process efficiently and in a cost-effective manner.

BACKGROUND

Polyolefins are of great use in industry and are materials from which many everyday products are made. When making polyolefins, drying the wet material as it exits a polymerization reactor in a steam heated flash line or transfer line is necessary (a so-called "transfer line dryer (TLD)). A TLD typically includes a section of pipe through which a material to be dried flows and that is at least partially surrounded by a jacket sufficient to contain steam or another heating liquid against the section of pipe for transferring heat to the section of pipe and so to a product stream to be dried that is present in the pipe. (A "steam jacket") These systems are typically configured with a steam control system to adjust the steam feed rate to the entire transfer line steam jacket in order to control a temperature of a polymer product or gas temperature at the end of the dryer line or in a vessel at the end of the dryer. In many cases this control scheme is sufficient, but in the case of polyolefins with reduced melting points or reduced softening temperatures, the steam delivery rate or pressure of steam delivered to the transfer line must be controlled to ensure that the polyolefin product does not melt or soften. This control can be achieved by limiting the steam pressure to transfer line dryer steam jackets such that the inner walls of the transfer line dryer do not exceed a critical temperature associated with the melting or softening temperature of the polymer product. Such a steam pressure limitation or clamp often leads to a reduced capacity of the transfer line dryer which then leads to a process bottleneck resulting in reduced production rates or a need to increase the size or capacity of the transfer line to increase the throughput rates of the polyolefin production line.

Relevant publications include U.S. Pat. Nos. 8,597,582, 3,428,619, US 2008/127507, EP 2 110 173 A, and EP 1 914 247 A1.

SUMMARY

The presently described method and apparatus provides a transfer line dryer that is used to its full potential by controlling the steam delivery rate or delivery pressure to individual sections of the transfer line. In many cases the process can be used to debottleneck existing transfer lines.

Thus, in any embodiment is a process for drying a polymer product in a steam-jacketed transfer line dryer comprising (or consisting of, or consisting essentially of) supplying steam to the steam jacket of the dryer at a first rate or pressure at a point D1 that is at or adjacent a polymer product inlet to the dryer and supplying steam to the steam jacket of the dryer at a second, lower rate or pressure at a point D2 that is downstream of the polymer product inlet, and flowing the polymer product through the transfer line dryer to obtain a dried polymer.

Also in any embodiment is an apparatus for conducting the above process. Thus, there is provided a transfer line dryer for drying a product of a polymerization reaction, that is, a polymer, comprising (or consisting essentially of, or consisting of) a plurality of sections of pipe jacketed to contain steam, each of the jackets configured to receive steam from a steam supply and to maintain a desired steam delivery rate or pressure so as to maintain a desired temperature of an inner surface of the pipe; and one or more pressure controllers configured to deliver steam at the desired pressure of steam or rate of steam delivery to each jacket of the transfer line dryer, such that the steam delivery rate or pressure delivered to at least a first or upstream jacket of the plurality of jackets is higher than the steam delivery rate or pressure delivered to at least one other of the plurality of second or downstream jackets.

In another configuration, an apparatus for conducting the process can be a transfer line dryer for drying a product of a polymerization reaction comprising (or consisting essentially of, or consisting of) at least upstream and downstream sections of pipe jacketed to contain steam, each of the jackets configured to receive steam from a steam supply and to maintain a desired pressure so as to maintain a desired temperature of an inner surface of the pipe; a steam supply to each of the jackets of each of the at least upstream and downstream sections of pipe, configured so that a pressure controller is disposed between the steam feed to the jacket of the upstream section and the steam feed to the jacket of the at least downstream section, the pressure controller controlling the steam feed to the jacket of the downstream section; a parallel steam feed joining a point of the steam supply downstream from the pressure controller to the jacket of the upstream section; a digital on/off valve disposed in the steam feed to the jacket of the upstream section; and a check valve disposed in the parallel steam feed to prevent bypass flow around the pressure controller when the digital on/off valve is open.

DETAILED DESCRIPTION

Figure 1:
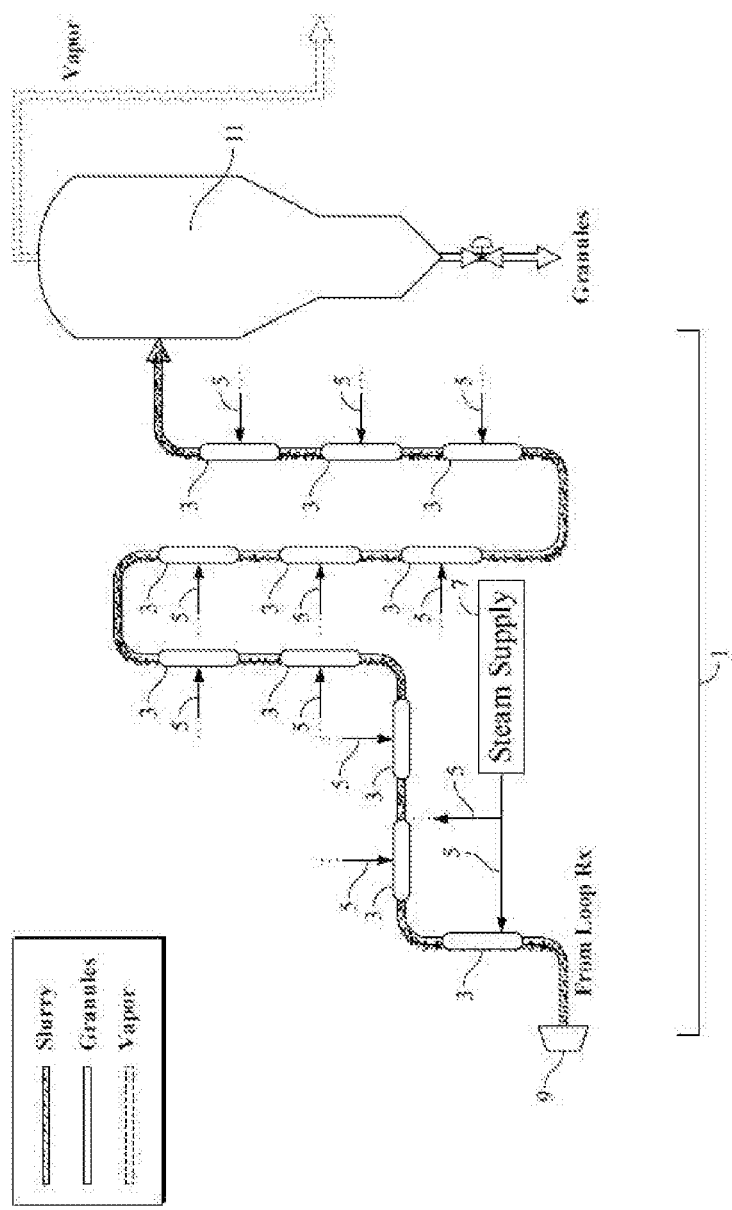
FIG. 1 illustrates a TLD for drying a polymer as typically positioned in a polymer production process.

Given that the temperature of the inner walls of a transfer line dryer are significantly reduced by flashing of process liquids as the polymer "dries" (i.e., as solvent for the polymer product is removed), steam can be delivered to the upstream stages of the transfer line dryer at much higher rates or pressures than the later stages where the liquid flashing rate is low to none. Delivery of steam to each stage of the transfer line dryer can be controlled with a steam pressure clamp or inner fluid or skin temperature clamp based on direct measurement of the temperature of each section of the transfer line dryer.

As used herein, "polymer" refers to a molecule or molecules having repeating monomer-derived units, preferably repeating units of ethylene- (ethylene homopolymer), propylene- (propylene homopolymer), or ethylene- and propylene-derived units (ethylene-propylene copolymer). Most preferably, the polymer is a propylene homopolymer or propylene copolymer comprising from 0.1 to 5 wt %, by weight of the polymer, or ethylene or C4 to C12 α-olefin derived units. Most preferably, the propylene homopolymer or copolymer has a melting point temperature, determined by Differential Scanning Calorimetry analysis, of less than 170, or 160, or 155, or 150° C., or within a range from 100, or 110, or 120, or 130° C. to 150, or 155, or 160, or 170° C.

Differential Scanning Calorimetry (DSC) may be carried out on the propylene homopolymer or copolymer using a TA Instrument Model Q-200. Measurements can be carried out by placing a sample of the polymer in a zero hermetic pan and encapsulated with lid using a pan press. The sample is then placed upon a disc on a platform in the DSC cell. An empty reference pan sits on a symmetric platform in the DSC cell. Heat flow is measured by comparing the difference in temperature across the sample and the reference. Sample sizes from 3.5 mg to 5 mg and are heated at rate of 10° C./min from −90° C. to 220° C. in nitrogen gas flowing at a rate of 50 ml/min. The samples are first heated from 23° C. to 220° C. to remove any thermal history. Then the samples are cooled from 220° C. to −90° C., then heated back up from −90° C. to 220° C. (second heating cycle). The melting point temperature is determined in this second heating cycle.

However, a simpler, more cost effective solution can be implemented. Process calculations can be used to estimate process temperatures and break the transfer line dryer into fewer sections to control the inner skin temperature of the transfer line dryer. In some instances, the transfer line dryer can be divided into two sections, where the upstream section is exposed to a higher steam pressure, for example full steam pressure, to maximize vapor flashing or "drying" and the downstream section remains in a typical steam flow or steam pressure control to provide control of the temperature of the polymer product at the end of the transfer line dryer. In some instances, the temperature of the TLD inner skin and/or process temperature (e.g., the temperature of the polymer product or the temperature of vapor flashed from and in thermal equilibrium with the polymer product) at the end of the upstream section of transfer line can be measured for feedback control to the steam pressure regulator. In some instances, the performance of the dryer can be modeled and direct measurement of the process temperature can be replaced by control based on the modeling results.

Thus, in any embodiment the invention lies in a process for drying a polymer product in a steam-jacketed transfer line dryer (TLD); the process including supplying steam to the TLD at a first delivery rate or pressure in one or more upstream portions of the TLD and supplying steam to the TLD at a second, lower rate or pressure at one or more downstream portions of the TLD. In general, in a given apparatus and under similar production conditions, the rate of steam delivery is proportional to the steam pressure that is established in a steam jacket section.

The polymer product can be in the form of a slurry comprising polymer solid and monomer liquid or monomer and co-monomer liquid. The slurry can further comprise a liquid diluent that is not monomer or co-monomer.

The inventive process controls or "regulates" (to cause the variable to be within a desired range or target value) the temperature of the inner surface of the TLD to maintain that temperature below the melting or softening temperature of the product polymer throughout the length of the TLD as heat goes into a polymer product stream flowing through the TLD and diluent of the product stream evaporates. In downstream sections of the TLD in which most or all of the diluent of the product stream (which can include a solvent, unreacted monomer, unreacted co-monomer, etc., in addition to the desired solid polymer) has been evaporated from the product stream. T2, the temperature applied to the TLD in the downstream portion(s), is therefore set lower than the temperature of the upstream portion(s) (T1) where a substantial amount of diluent is present in the product stream.

Thus, in some versions of the process, the method for regulating the second steam delivery rate or pressure of steam delivery can comprise:
  a) sensing or calculating the temperature T1 of the polymer product slurry at a point D1 as it enters the TLD;
  b) sensing a second temperature T2, or calculating T2 from the decline in temperature dT from T1 that would result from evaporation of liquid from the product stream, which may be a slurry, as the product stream flows through the TLD, at least at a point D2 along the TLD downstream from D1; and
  c) regulating, based upon T2, the rate of steam delivery or the pressure of steam delivered to the steam jacket of the TLD at the point D2 and/or downstream therefrom so as to maintain the temperature of an inner surface of the TLD below the melting or softening temperature of the polymer throughout the length of the TLD.

Additionally or alternatively, the process can further comprise a method for regulating the first steam delivery rate or pressure that comprises calculating as the first steam delivery rate or pressure, the steam delivery rate or pressure required to maintain the temperature to evaporate the liquid volume of the polymer product slurry entering the TLD at D1 over a time t1 for the polymer product to traverse the distance from D1 to D2.

Additionally or alternatively, the process can be performed using a TLD having a steam jacket composed of a plurality of sections of pipe jacketed to contain steam (i.e., a plurality of "steam jackets") and each of the steam jackets of the TLD are configured to receive steam at a controlled rate or pressure at a point in each section of the TLD.

Additionally or alternatively, the process can be one in which the first steam delivery rate or pressure is a full steam delivery rate or pressure (i.e., 100% or 1.0) that is applied to the portion of the TLD between D1 and D2 and the second steam delivery rate or pressure is a fraction of that, such as 0.9 or less, or 0.8 or less, or 0.7 or less, or 0.6 or less of full steam delivery rate or pressure throughout the portion of the TLD distal from D2. The second steam delivery rate or pressure can be from ambient atmospheric pressure or the corresponding delivery rate to 0.6 of the full steam delivery rate or pressure, from ambient atmospheric pressure or the corresponding delivery rate to 0.7 of the full steam delivery rate or pressure, from ambient atmospheric pressure or the corresponding delivery rate to 0.8 of the full steam delivery rate or pressure, or from ambient atmospheric pressure or the corresponding delivery rate to 0.9 of the full steam delivery rate or pressure. Or, the second stream delivery rate or pressure can be in an intermediate range, for example, from 0.4 to 0.9 of the full steam delivery rate or pressure, or from 0.5 to 0.8 of the full steam delivery rate or pressure, or the like.

Additionally or alternatively, the length D1 to D2 can be one-half the total length of the TLD.

Additional embodiments of the invention include an apparatus configured to effect the temperature control process. Thus, the invention can be embodied in a transfer line dryer for drying a product stream of a polymerization reaction. The apparatus can include a plurality of sections of pipe jacketed to contain steam. A steam supply provides steam to each of the jackets at a desired rate or pressure so as to maintain a desired temperature of an inner surface of the pipe. The apparatus can also include one or more pressure indicators/controllers configured to deliver the steam at the desired rate or pressure to each steam jacket of the apparatus, such that the steam delivery rate or pressure delivered to the upstream portion of the apparatus is higher than the steam delivery rate or pressure delivered to the downstream portion of the apparatus.

Some configurations of the apparatus apply either full steam delivery rate or pressure or a controlled steam delivery rate or pressure to the upstream portion(s) of the TLD, depending on the temperature measured in the downstream portions of the TLD or at another apparatus in the process environment, such as a High Pressure Separator. In such a configuration, the TLD apparatus can include a plurality of sections of pipe jacketed to contain steam and configured to receive steam from a steam supply and to maintain a desired steam delivery rate or pressure so as to maintain a desired temperature of an inner surface of the pipe. A steam supply provides steam to each of the steam jackets at a desired rate or pressure so as to maintain a desired temperature of an inner surface of the pipe.

The plurality of sections are arranged as at least upstream and downstream sections. The steam supply to the jackets of each of the at least upstream and downstream sections is configured so that a pressure indicator/controller is disposed between the steam feed to the upstream jacket and the steam feed to the at least downstream jacket, and a parallel steam feed joins a point of the steam supply downstream from the pressure controller to the steam feed to the upstream jacket, the pressure controller controlling the steam feed to the jacket of the downstream section.

The apparatus in this configuration also includes a digital on/off valve disposed in the steam feed to the upstream jacket, a pressure control valve controlled by the pressure controller and disposed in the steam feed between the digital on/off valve and the point in the steam feed where the parallel steam feed joins the steam supply, and a check valve is disposed in the parallel steam feed to prevent bypass flow around the pressure controller when the digital on/off valve is open.

In some configurations of a TLD, a digital on/off valve is actuated by a software application that is programmed to monitor a pressure indicator/controller output (OP) value and if the OP>X % for Z1 seconds and the digital valve is closed, the digital valve is opened to expose the upstream section of the TLD to full steam pressure or full steam delivery rate and OP is simultaneously reset to (X−X0) % to maintain stable performance of the TLD, and if the OP<Y % for Z2 seconds and the digital valve is open, the digital valve is closed to expose the upstream section of the TLD to the controlled steam pressure or controlled steam delivery rate and OP is simultaneously reset to (Y+Y0) % to maintain stable performance of the TLD.

The software application is coded commands that operate a computer or computing system that may be part of the apparatus described herein. Such a computing system might also include means for sample pre-treatment and data smoothing. As used herein, a "computer" or "computing system" is a general purpose device that can be coded or programmed to carry out a set of arithmetic or logical operations automatically, and may also be capable of either manual data input or automatic acceptance of data from a source or output such as a pressure or temperature sensor.

Coding such a program is considered within the skill of the ordinary artisan of skill. Alternatively, the digital on/off valve can be hardwired with such a program.

In such configurations, X can be, for example, from 70 to 90%, or 75 to 85%, or about 80%. In such configurations, X0 can be from 15 to 25%, or about 20%. In such configurations, Z1 can be from 40 to 80 seconds, or 50 to 70 seconds, or 55 to 65 seconds, or about 60 seconds. In such configurations, Y can be from 20 to 60%, or 30 to 50%, or 35 to 45%, or about 40%. In such configurations, Y0 can be from 10 to 30%, or from 15 to 25%, or about 20%. In such configurations, Z2 can be from 5 to 15 seconds, or 7 to 12 seconds, or about 10 seconds.

In some configurations of the TLD, the application controlling the digital valve can read the temperature of the vapor phase of a high pressure separator downstream from the TLD.

In some configurations of the TLD, the digital on/off valve can be actuated by an application that monitors the TLD steam pressure and the temperature of the product at the end of the TLD, and when both of (a) and (b) are true for a first set time:
  a) the TLD steam pressure exceeds the maximum desired pressure, and
  b) the temperature of product at the end of the TLD is below the desired temperature;
  c) then the valve is closed; and when either or both of (c) or (d) are true for a second set time;
  d) the TLD steam pressure is below the maximum desired pressure by a set pressure differential, or
  e) the temperature of product at the end of the TLD is above the desired temperature by a set temperature differential; and
  f) then the valve is opened.

In such configurations of the TLD, the first set time can be from 30 to 90 seconds, or from 40 to 80 seconds, or from 50 to 70 seconds, or about 60 seconds. In such configurations, the second set time can be from 5 to 15 seconds, or from 7 to 12 seconds, or about 10 seconds. In such configurations, the set pressure differential can be from 2 to 8 psi, or from 3 to 7 psi, or from 4 to 6 psi, or about 5 psi. In such configurations, the set temperature differential can be from 1.0 to 4° C., or from 1.5 to 3° C., or about 2° C.

FIG. 1 illustrates the environment of the process and associated apparatus in a process for producing a polymer. A transfer line dryer (TLD) (1) comprises one or more steam jackets (3) that are fed by steam feeds (5). The steam feeds (5) may be configured in a variety of ways, for example each coming individually from a steam supply (7), or a plurality of feeds (5) being joined and fed as a group by one common feed from the steam supply in a "manifold" configuration. A plurality of manifolds may also be used to distribute the steam to a plurality of subsets of the steam jackets. The plurality of individual steam feeds or the plurality of manifolds, where present, may be controlled independently.

The TLD (1) also comprises an input from a polymerization reactor (9) through which a polymer product stream, illustrated as a slurry, is fed into the TLD. The polymer product stream is dried as it progresses through the TLD and the dried polymer product stream is fed as a mixture of granules and vapor into a high pressure separator (11), the top product of which is a vapor of the unreacted polymer and other gases, and the bottom product of which is a granular polymer product.

Figure 2:
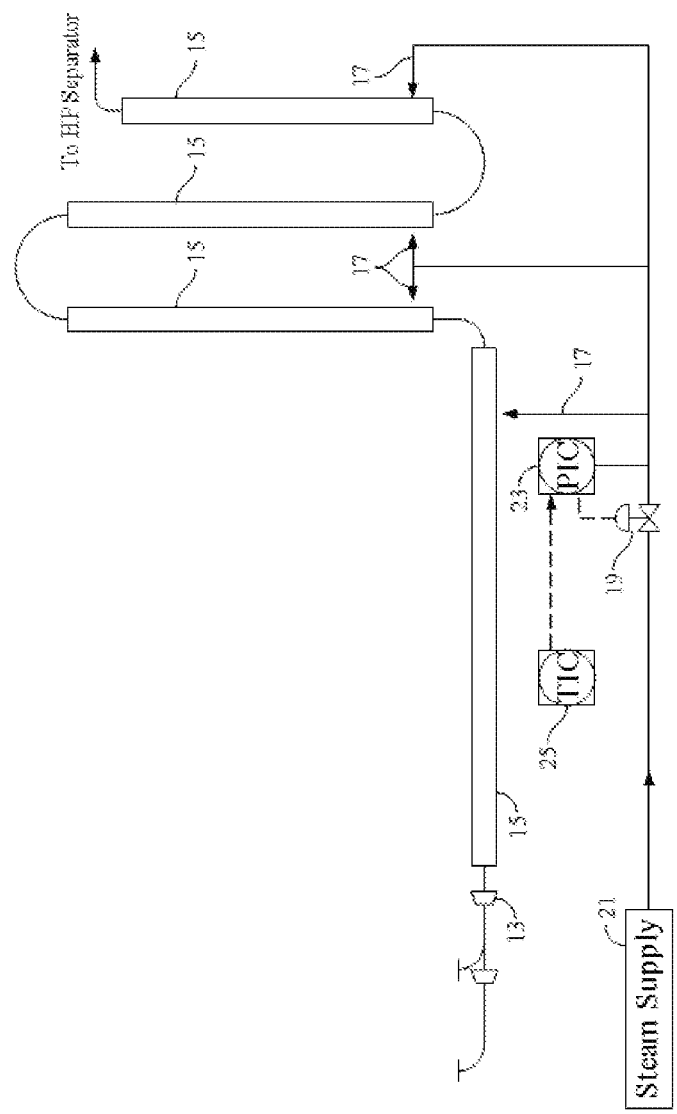
FIG. 2 illustrates a conventional TLD control scheme where the temperature in a downstream vessel, a High Pressure Separator in this case, is controlled using a steam pressure controller or flow controller to regulate the delivery of steam to the TLD steam jackets.

FIG. 2 illustrates the conventional TLD control scheme where the temperature of a product stream, typically of a vapor phase, in a downstream vessel, a high pressure separator (HPS—not shown) in this case, is controlled using a steam pressure controller or flow controller to regulate the delivery of steam to the TLD steam jackets.

In FIG. 2, a TLD comprises an input for receiving a polymer product stream (13) and a plurality of steam jackets (15) each fed by a steam feed (17) arranged in a manifold configuration, a pressure control valve (19) being disposed in the common feed from a steam supply (21). The pressure control valve (19) is set to deliver steam at a pressure output from a pressure controller (23) that is controlled by output from a temperature sensor (25) that reads the temperature of the vapor phase of a high pressure separator (not shown).

A TLD functions in part by adding energy to a product stream leaving a polymerization reactor to vaporize a liquid component of the product stream. One problem addressed by the invention is to optimize the steam pressure along the entire TLD as to the amount of energy to add for this phase change, and therefore maximize the capacity of the TLD. An economic advantage of the process is to reduce cost of a new process unit and/or provide a way to de-bottleneck an existing unit.

As the liquid component of a polymer product stream vaporizes in the upstream stages of a TLD it dramatically cools the process stream as well as the TLD inner walls, this cooling allows for higher steam temperature/pressures in the upstream TLD jacket(s) than may be allowed in the TLD sections near the end of the TLD.

Figure 3:
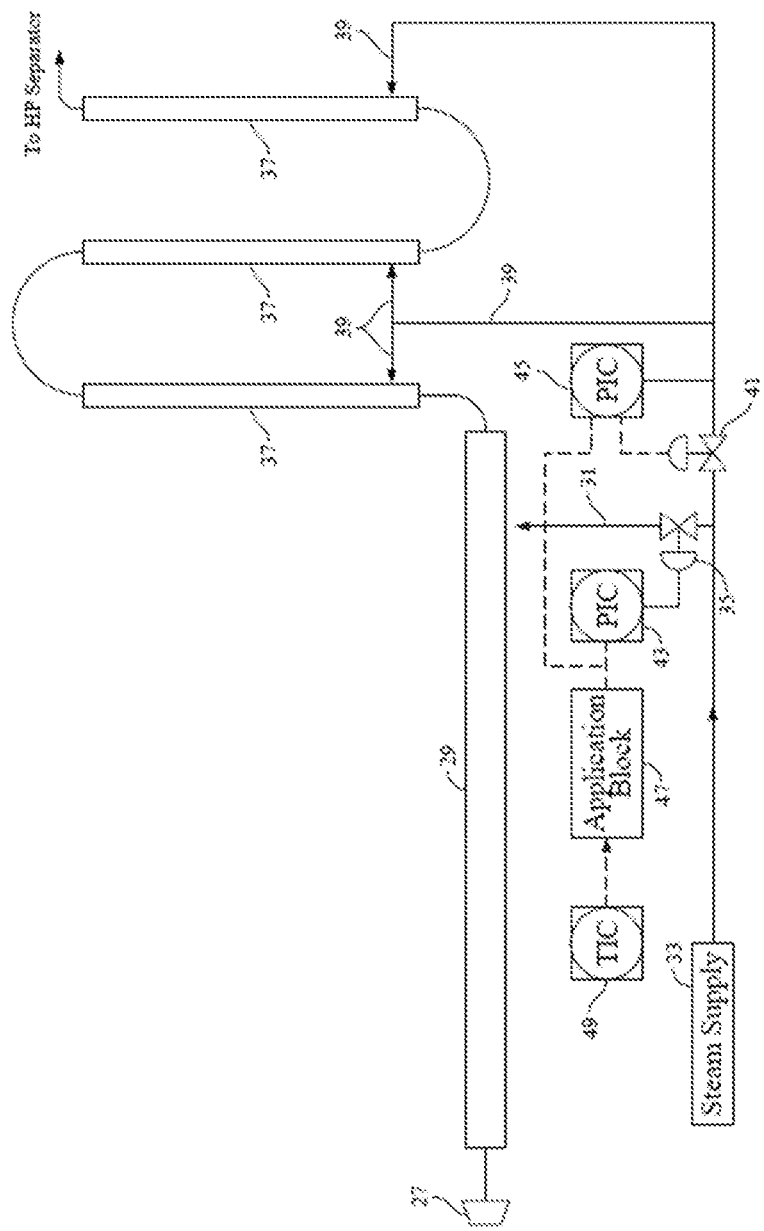
FIG. 3 illustrates a configuration of the invention for drying a polymer product in a steam-jacketed transfer line dryer.

FIG. 3 illustrates a control configuration to maximize the TLD capacity. As shown in FIG. 3, a TLD may consist of multiple sections. Only four sections are shown in FIG. 3, but more, even by an order of magnitude, or fewer sections are possible depending on the design of the TLD and the production rate of the polymer production unit. The process and apparatus for implementing the process take advantage of these independent sections as well as the nature of the process.

In FIG. 3, a TLD comprises an input for receiving a polymer product stream (27) and an upstream steam jacket (29), fed by a first steam feed (31) from a steam supply (33, the steam feed (31) having disposed therein a first steam pressure control valve (35). The illustrated TLD also comprises a plurality of downstream steam jackets (37) each fed by a downstream steam feed (39) arranged in a manifold configuration, a second steam pressure control valve (41) being disposed in the common feed from the steam supply (33). The pressure control valves (35) and (41) are set to deliver steam at a desired pressure by individual signals output from pressure controllers (43 and 45, respectively) programmed by an application block (47) based on input from a temperature sensor (49) that reads the temperature of the vapor phase of a high pressure separator (not shown).

In the case where the TLD inner wall temperature must be limited, a pressure controller is often used and the controller is set to a maximum steam pressure to ensure that the inner walls do not get too hot or exceed the melting or softening temperature of the polymer being produced. A steam table—Table 1 below—can be used to make the correlation between the steam temperature and pressure.

TABLE 1

Steam Table

| Inches Mercury Vacuum | Absolute Pressure (P.S.I.A.) | Temperature | Gauge Pressure (P.S.I.G.) | Temperature | Gauge Pressure (P.S.I.G.) | Temperature Of | Gauge Pressure (P.S.I.G.) | Temperature | Gauge Pressure (P.S.I.G.) | Temperature |
|---|---|---|---|---|---|---|---|---|---|---|
| 29.74 | 0.089 | 32 | 0 | 212 | 135 | 358.3 | 285 | 417.2 | 570 | 483.4 |
| 29 | 0.451 | 76.5 | 2 | 218.5 | 140 | 360.8 | 290 | 418.7 | 580 | 485.2 |
| 28 | 0.942 | 99.7 | 4 | 224.4 | 145 | 363.4 | 295 | 420.2 | 590 | 487 |
| 27 | 1.43 | 114 | 6 | 229.8 | — | — | — | — | — | — |
| 26 | 1.92 | 124.6 | 8 | 234.6 | 150 | 365.9 | 300 | 421.7 | 600 | 488.8 |
| — | — | — | — | — | 155 | 368.3 | 310 | 424.6 | 650 | 497.4 |
| 25 | 2.42 | 133.3 | 10 | 239 | 160 | 370.6 | 320 | 427.4 | 700 | 505.4 |
| 24 | 2.91 | 140.3 | 15 | 249.7 | 165 | 372.9 | 330 | 430.3 | — | — |
| 23 | 3.4 | 146.3 | 20 | 258.8 | 170 | 375.2 | 340 | 433 | 750 | 513.1 |
| 22 | 3.89 | 151.7 | — | — | — | — | — | — | 800 | 520.3 |
| 21 | 4.38 | 156.5 | 25 | 266.8 | 175 | 377.4 | 350 | 435.6 | 850 | 527.3 |
| — | — | — | 30 | 274 | 180 | 379.5 | 360 | 438.2 | 900 | 533.9 |
| 20 | 4.87 | 161 | 35 | 280.6 | 185 | 381.7 | 370 | 440.8 | 950 | 540.3 |
| 19 | 5.36 | 165.2 | 40 | 286.7 | 190 | 383.7 | 380 | 443.3 | — | — |
| 18 | 5.85 | 168.9 | 45 | 292.4 | 195 | 385.8 | 390 | 445.7 | 1000 | 546.4 |
| 17 | 6.35 | 172.5 | — | — | — | — | — | — | — | — |
| 16 | 6.84 | 175.8 | 50 | 297.7 | 200 | 387.8 | 400 | 448.1 | — | — |
| — | — | — | 55 | 302.6 | 205 | 389.7 | 410 | 450.5 | — | — |
| 15 | 7.33 | 178.9 | 60 | 307.3 | 210 | 391.7 | 420 | 452.8 | — | — |
| 14 | 7.82 | 181.8 | 65 | 311.8 | 215 | 393.6 | 430 | 455.1 | — | — |
| 13 | 8.31 | 184.6 | 70 | 316 | 220 | 395.4 | 440 | 457.3 | — | — |
| 12 | 8.8 | 187.2 | — | — | — | — | — | — | — | — |
| 11 | 9.29 | 189.7 | 75 | 320 | 225 | 397.3 | 450 | 459.5 | — | — |
| — | — | — | 80 | 323.9 | 230 | 399.1 | 460 | 461.7 | — | — |
| 10 | 9.78 | 192.1 | 85 | 327.6 | 235 | 400.8 | 470 | 463.8 | — | — |
| 9 | 10.27 | 194.4 | 90 | 331.1 | 240 | 402.6 | 480 | 465.9 | — | — |
| 8 | 10.77 | 196.7 | 95 | 334.6 | 245 | 404.3 | 490 | 468 | — | — |
| 7 | 11.26 | 198.8 | — | — | — | — | — | — | — | — |
| 6 | 11.75 | 200.9 | 100 | 337.9 | 250 | 406 | 500 | 470 | — | — |
| — | — | — | 105 | 341.1 | 255 | 407.7 | 510 | 472 | — | — |
| 5 | 12.24 | 202.9 | 110 | 344.1 | 260 | 409.3 | 520 | 474 | — | — |

TABLE 1-continued

Steam Table

| Inches Mercury Vacuum | Absolute Pressure (P.S.I.A.) | Temperature | Gauge Pressure (P.S.I.G.) | Temperature | Gauge Pressure (P.S.I.G.) | Temperature Of | Gauge Pressure (P.S.I.G.) | Temperature | Gauge Pressure (P.S.I.G.) | Temperature |
|---|---|---|---|---|---|---|---|---|---|---|
| 4 | 12.73 | 204.8 | 115 | 347.1 | 265 | 410.9 | 530 | 475.9 | — | — |
| 3 | 13.22 | 206.7 | 120 | 350 | 270 | 412.5 | 540 | 477.8 | — | — |
| 2 | 13.71 | 208.5 | — | — | — | — | — | — | — | — |
| 1 | 14.2 | 210.3 | 125 | 352.8 | 275 | 414.1 | 550 | 479.7 | — | — |
| 0 | 14.70 | 212 | 130 | 355.6 | 280 | 415.7 | 560 | 481.6 | — | — |

For control of the steam delivery rate or pressure, the TLD is divided into at least two control sections; the temperature from a downstream vessel is used to control the steam temperature/pressure in the two sections for increased efficacy. Additional control sections may be implemented; each of the serially downstream control sections is provided with steam at the same rate or pressure as the control section upstream adjacent control section or at a lower rate or pressure than that section.

Figure 4:
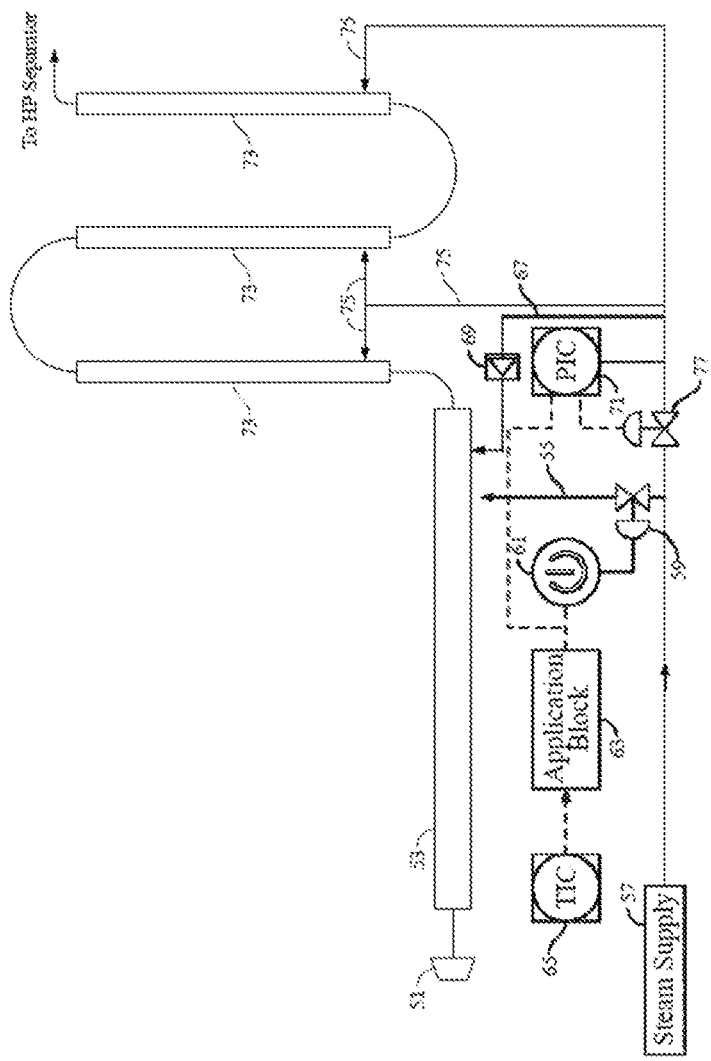
FIG. 4 illustrates another configuration of the invention for drying a polymer product in a steam-jacketed transfer line dryer.

In an alternative arrangement, illustrated in FIG. 4, the first, analog Pressure Indicator/Controller (PIC) on the upstream section of the TLD can be eliminated and replaced with a digital on/off valve and a parallel feed to the first section, the inlet of the parallel feed being downstream of the control to the rest of the TLD. A check valve is placed in that parallel line to prevent bypass flow around the PIC when the digital valve is open. In such an arrangement, the upstream TLD section is operating at either the full steam header pressure or at the controlled pressure.

In FIG. 4, the illustrated TLD comprises an input for receiving a polymer product stream (51) and an upstream steam jacket (53), fed by a first steam feed (55) from a steam supply (57), the first steam feed (55) having disposed therein a digital on/off valve (59) that is controlled by a digital on/off switch (61) receiving signals from an application block (63) based on input from a temperature sensor (65) that reads the temperature of the vapor phase of a high pressure separator (downstream from the TLD—not shown).

The upstream steam jacket is also fed by a second, parallel steam feed (67) from the common feed of the manifold and having a check valve (69) disposed therein configured to prevent flow of steam around a pressure controller (71) when the digital valve (59) is open.

The illustrated TLD also comprises a plurality of downstream steam jackets (73) each fed by a downstream steam feed (75) arranged in a manifold configuration, a pressure control valve (77) being disposed in the common feed from the steam supply (57) and upstream of the inlet of the parallel feed to the upstream steam jacket (67). The pressure control valve (77) is set to deliver steam at a desired pressure by signals output from a pressure controller (71) programmed by the application block (63).

The "application block" (63) shown in FIGS. 3 and 4 has many options and configurations; ranging from a thorough model of the TLD with additional inputs (not shown) from the reactor, intermediate temperatures of the TLD, etc., to a simple Distributed Control System application (e.g. Control Language code) that monitors the temperature and performance of the pressure controllers (e.g., set point, present value, output).

Figure 5:
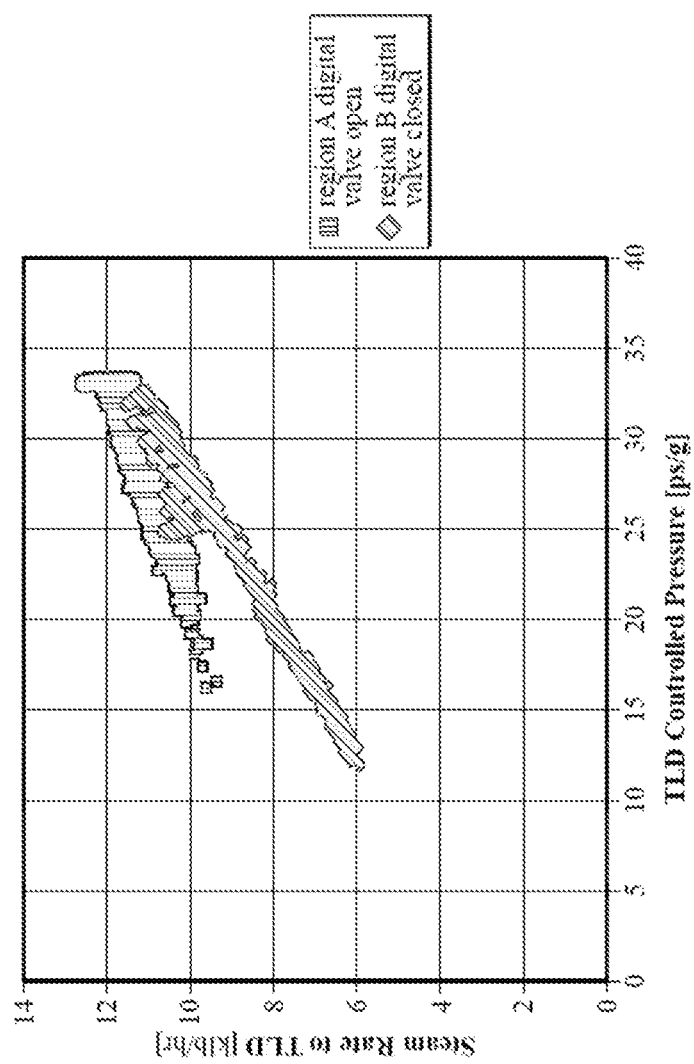
FIG. 5 presents data showing the control of the steam delivery rate to the TLD vs. the controlled pressure downstream of the Pressure Indicator/Controller (PIC) in the configuration illustrated in FIG. 4.

The efficacy of the inventive TLD control configuration is shown in FIG. 5. The data in FIG. 5 are collected during a RCP run producing polypropylene with low levels of ethylene to reduce its melting point. Such a composition has a softening point that is lower than that of a typical high crystallinity polypropylene homopolymer.

There is a clear economic benefit to the inventive process as the constraint on TLD temperature so as to avoid product deterioration increases. It is possible that for drying a product requiring a 20 psig pressure limit (e.g., a random copolymer), one can expect a benefit of up to a 25% increase in throughput of the drying process compared to the similar process using a TLD having a steam jacket with a constant steam feed rate throughout its length.

EXAMPLE

Data were collected during a production run of random polypropylene copolymer. For this run, a small amount of ethylene was fed into the polymerization reaction system to produce a polymer (RCP) with reduced crystallinity and melting point compared to its high crystallinity homopolymer counterpart. To avoid any fouling issues in the downstream separation process (in the transfer line dryer) the TLD wall temperature was kept below a safe maximum— below about 280° F. (138° C.) has been established in this case based on experience with product properties and past fouling events. That temperature, 280° F. (138° C.), corresponds to about 35 psig steam pressure which accordingly established the maximum steam pressure used in this example.

For this run, a RCP slurry (solid-liquid) was let down from the polymerization reactors at about 167° F. (75° C.) with approximately 55 wt %/o solids and passed through a TLD—the TLD having a total of 19 sections and configured for control of steam pressure to the various sections of the steam jacket as shown in FIG. 4—toward a high pressure separator (HPS).

The application block (8) receives the Pressure Indicator/Controller (PIC) output value (OP) and if OP>X % for Z1 seconds and the digital valve is closed, the digital valve is opened to expose the upstream section of the TLD to full steam pressure and the PIC OP is simultaneously reset to (X−Xo) % to maintain stable performance of the TLD. Likewise if OP<Y % for Z2 seconds and the digital valve is open, the digital valve is closed to expose the upstream section of the TLD to the controlled steam pressure and the PIC OP is simultaneously reset to (Y+Yo) % to maintain stable performance of the TLD.

The HPS temperature is regulated to be above the monomer vaporization temperature, in this example being set at 170° F. (77° C.), by feedback to the TLD steam pressure controller so that a solid-vapor mixture is received at the HPS. As the slurry moves down the TLD residual monomer flashes, cooling the inner surfaces of at least a portion of the TLD. Modeling of the TLD indicates that the degree of flash cooling in the upstream about ½ of the TLD (8 sections) is sufficient to maintain a low inner surface temperature in the TLD and that the full steam pressure (about 45 psig) can be applied in those sections. The production run RCP production rate was manipulated with the full pressure digital valve open and closed to generate the capacity evaluation data.

In FIG. 5, the points in the region "A" were collected with the digital valve open, and the points in the region "B" were collected with the digital valve closed. FIG. 5 shows that when the digital valve is opened to expose the upstream section of the TLD to higher pressure steam, the total steam that can be fed to the TLD increases by about 10% (about 9 psig increasing up to 10.5 psig). There are some "off curve" data resulting from transitions and process upsets during the "valve closed" period when the steam pressure must be constrained to 25 psig (in the downstream TLD section) to protect the product and prevent process fouling. The amount of energy in the increased total steam correlates directly with the energy needed to evaporate the volume of liquid propylene that must be flashed from the product stream leaving the polymerization reactors; and therefore indicates the maximum production rate that could be achieved at a given TLD limit pressure.

In a process- or method-type claim, the phrase "consisting essentially of" means that there are no other steps or modifications that would impose a chemical change (e.g., oxidation state, coordination to the metal, etc.) to the heterogeneous single-site polymer before it is passed to the polymerization reactor.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A process for drying a polymer product comprising providing a transfer line dryer (TLD) having at least an upstream steam jacket and a downstream steam jacket, supplying steam to the upstream steam jacket of the TLD at a first steam delivery rate or pressure at a point D1 at or adjacent to a polymer product inlet to the TLD and supplying steam to the downstream steam jacket of the TLD at a second, lower rate or pressure at a point D2 downstream of the polymer product inlet, in which the first steam delivery rate or pressure is a full steam delivery rate or pressure that is applied to a portion of the TLD between D1 and D2 and a second steam delivery rate or pressure is 0.6 of full steam delivery rate or pressure, or less, throughout a portion of the TLD distal from D2; and flowing the polymer product through the TLD to obtain a dried polymer.

2. The process of claim 1, further comprising:
sensing or calculating a temperature T1 of a polymer product stream at a point D1 as it enters the TLD;
sensing a second temperature T2 of a polymer product stream or of an inner surface of the TLD, or calculating T2 from a decline in temperature dT from T1 resulting from evaporation of liquid from the polymer product stream as the polymer product stream flows through the TLD, at least at a point D2 along the TLD downstream from D1; and
regulating, based upon T2, a pressure of steam delivered to the steam jacket of the TLD at the point D2 or downstream therefrom so as to maintain a temperature of the inner surface of the TLD below a melting or softening temperature of the polymer product throughout a length of the TLD.

3. The process of claim 1, in which the upstream steam jacket and downstream steam jacket of the TLD are composed of a plurality of sections configured to receive steam at a controlled delivery rate or pressure at a point in each section of the steam jacket.

4. The process of claim 1, further comprising a step of regulating the first steam delivery rate or pressure that comprises calculating as the first steam delivery rate or pressure, a rate or pressure required to maintain a temperature to evaporate a liquid volume of the polymer product entering the TLD at D1 over a time t1 for the polymer product to traverse a distance from D1 to D2.

5. The process of claim 4, in which the distance from D1 to D2 is one-half the total length of the TLD.

6. The process of claim 1, in which the polymer product is in the form of a slurry comprising solid polymer and monomer or monomer and co-monomer liquid.

7. The process of claim 6, in which the slurry further comprises a liquid diluent.

8. A transfer line dryer (TLD) comprising
an upstream section of pipe and a downstream section of pipe each jacketed to contain steam, each jacket configured to receive steam from a steam supply and to maintain a desired pressure so as to maintain a desired temperature of an inner surface of the pipe;
a steam feed to the jackets of each of the upstream section of pipe and downstream section of pipe, a pressure controller disposed between a steam feed to a jacket of the upstream section of pipe and a steam feed to a jacket of the downstream section of pipe, the pressure controller controlling the steam feed to a jacket of the downstream section of pipe;
a parallel steam feed joining a point of the steam supply downstream from the pressure controller to the jacket of the upstream section of pipe;
a digital on/off valve disposed in a steam feed to a jacket of the upstream section;
a pressure control valve controlled by the pressure controller and disposed in the steam feed between the digital on/off valve and a point where the parallel steam feed joins the steam feed; and
a check valve disposed in a parallel steam feed to prevent bypass flow around the pressure controller when the digital on/off valve is open.

9. The transfer line dryer of claim 8, in which the digital on/off valve is actuated by a software application that is programmed to monitor a pressure indicator/controller output (OP) value and if the OP>X % for Z1 seconds and the digital on/off valve is closed, the digital on/off valve is opened to expose the upstream section of pipe to full steam pressure or full steam delivery rate and OP is simultaneously reset to (X−X0)% to maintain stable performance of the TLD, and if the OP<Y % for Z2 seconds and the digital on/off valve is open, the digital on/off valve is closed to expose the upstream section of pipe to controlled steam pressure or controlled steam delivery rate and OP is simultaneously reset to (Y+Y0)% to maintain stable performance of the TLD.

10. The transfer line dryer of claim 9, in which the software application reads the temperature of a vapor phase of a high pressure separator downstream from the TLD.

11. The transfer line dryer of claim 9, in which X is from 70 to 90, X0 is from 15 to 25, Z1 is from 40 to 80, Y is from 20 to 60, Y0 is from 10 to 30 and Z2 is from 5 to 15.

12. The transfer line dryer of claim 8, in which the digital on/off valve is actuated by an application that monitors a TLD steam pressure and a temperature of a product at an end of the TLD, and when both of (a) and (b) are true for a first set time:

a) a TLD steam pressure exceeds a maximum desired pressure, and
b) a temperature of a product at an end of the TLD is below a desired temperature; then the digital on/off valve is closed; or when either of (c) or (d), or both, is/are true for a second set time:
c) a TLD steam pressure is below a maximum desired pressure by a set pressure differential; or
d) a temperature of a product at an end of the TLD is above a desired temperature by a set temperature differential; and then the digital on/off valve is opened.

13. The transfer line dryer of claim 12, in which the first set time is from 30 to 90 seconds, a second set time is from 5 to 15 seconds, the set pressure differential is from 2 to 8 psi and the set temperature differential is from 1 to 4° C.

* * * * *